US012612313B2

(12) United States Patent
Iseki et al.

(10) Patent No.: US 12,612,313 B2
(45) Date of Patent: Apr. 28, 2026

(54) METHOD FOR PRODUCING LITHIUM HALIDE COMPOUND

(71) Applicant: IDEMITSU KOSAN CO.,LTD., Tokyo (JP)

(72) Inventors: Yusuke Iseki, Chiba (JP); Takashi Nakagawa, Ichihara (JP); Toyohiko Iwai, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 635 days.

(21) Appl. No.: 17/927,765

(22) PCT Filed: May 20, 2021

(86) PCT No.: PCT/JP2021/019234
§ 371 (c)(1),
(2) Date: Nov. 25, 2022

(87) PCT Pub. No.: WO2021/241405
PCT Pub. Date: Dec. 2, 2021

(65) Prior Publication Data
US 2023/0242408 A1      Aug. 3, 2023

(30) Foreign Application Priority Data

May 27, 2020      (JP) ................................. 2020-092746

(51) Int. Cl.
*C01D 15/04*            (2006.01)
(52) U.S. Cl.
CPC .......... *C01D 15/04* (2013.01); *C01P 2002/70* (2013.01); *C01P 2004/03* (2013.01)

(58) Field of Classification Search
None
See application file for complete search history.

(56) References Cited

U.S. PATENT DOCUMENTS

| | | | |
|---|---|---|---|
| 5,514,491 | A | 5/1996 | Webber |
| 2004/0033191 | A1 | 2/2004 | Wietelmann et al. |

(Continued)

FOREIGN PATENT DOCUMENTS

| | | |
|---|---|---|
| CA | 2433095 A1 | 12/2003 |
| CN | 105186014 A | 12/2015 |

(Continued)

OTHER PUBLICATIONS

Arkhipov et al (N. S. Kurnakov Institute of General and Inorganic Chemistry, Academy of Sciences of the USSR, Moscow. Translated from Izvestiya Akademii Nauk SSSR, Seriya Khimicheskaya, No. 7, pp. 1660-1662, Jul. 1975. Original article submitted Jan. 15, 1975 (Year: 1975).*

(Continued)

*Primary Examiner* — Yun Qian
(74) *Attorney, Agent, or Firm* — Element IP, PLC

(57) ABSTRACT

The present invention relates to a method for producing a lithium halide compound, capable of industrially advantageously producing a lithium halide compound having a low water content, particularly lithium bromide and lithium iodide, at a high reaction efficiency without accompanying a step of directly removing water, and the method including mixing lithium sulfide, a halogen molecule of at least one of bromine and iodine, and a first solvent; and removing the first solvent, wherein the first solvent is a solvent that dissolves a lithium halide containing the same halogen element as the halogen molecule.

14 Claims, 4 Drawing Sheets

(56) References Cited

U.S. PATENT DOCUMENTS

| | | | |
|---|---|---|---|
| 2018/0185131 A1 | 7/2018 | Allen et al. | |
| 2020/0259210 A1 | 8/2020 | Makino | |

FOREIGN PATENT DOCUMENTS

| | | |
|---|---|---|
| CN | 105503489 A | 4/2016 |
| CN | 107923071 A | 4/2018 |
| CN | 108780682 A | 11/2018 |
| JP | 2003073454 A | 3/2003 |
| JP | 2005502165 A | 1/2005 |
| JP | 2005228570 A | 8/2005 |
| JP | 2013103851 A | 5/2013 |
| JP | 2013201110 A | 10/2013 |
| JP | 2013256416 A | 12/2013 |
| JP | 2014065637 A | 4/2014 |
| JP | 2014065638 A | 4/2014 |
| WO | WO-2017159665 A1 | 9/2017 |

OTHER PUBLICATIONS

Extended European Search Report issued Aug. 27, 2024 in European Patent Application No. 21811810.7, 6 pages.
Combined Chinese Office Action and Search Report issued Jul. 25, 2024 in corresponding Chinese Patent Application No. 202180037542.4 (with English translation), 13 pages.
Office Action issued Dec. 3, 2024, in corresponding Japanese Patent Application No. 2022-526960 (with English translation), 6 pages.
Office Action issued Apr. 8, 2025, in Japanese Patent Application No. 2022-526960 (with English translation), 6 pages.
International Search Report issued Jul. 6, 2021 in PCT/JP2021/019234 (with English translation), 5 pages.
Combined Chinese Office Action and Search Report issued Dec. 4, 2024, received on Dec. 25, 2024, in corresponding Chinese Patent Application No. 202180037542.4 (with machine English translation), 20 pages.

* cited by examiner

[Fig. 1]
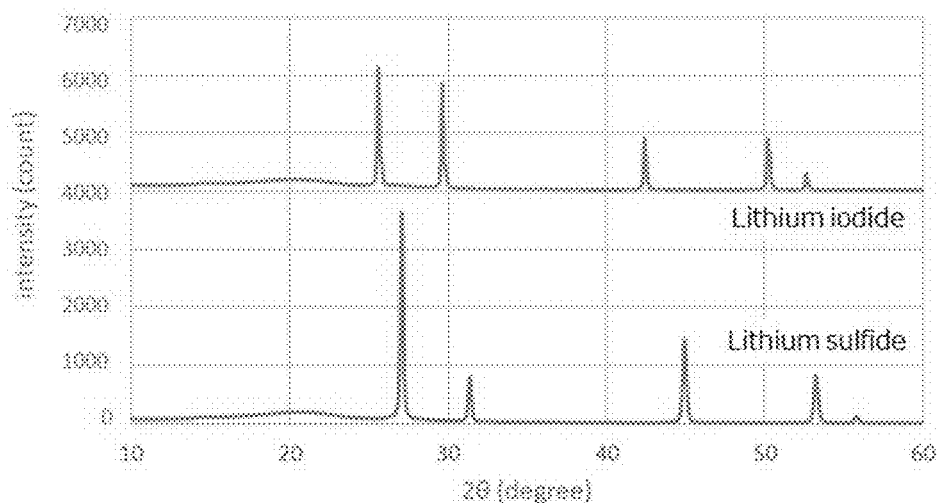
[Fig. 2]
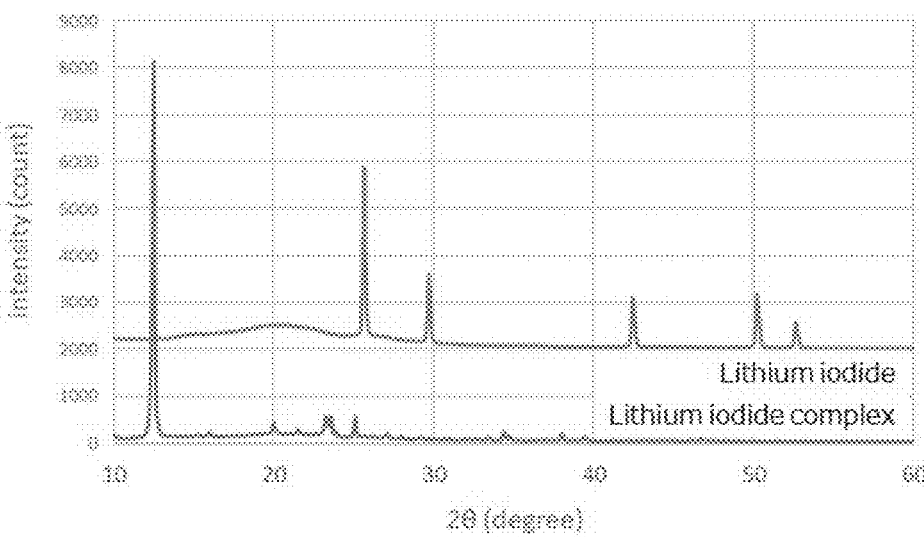

[Fig. 3]
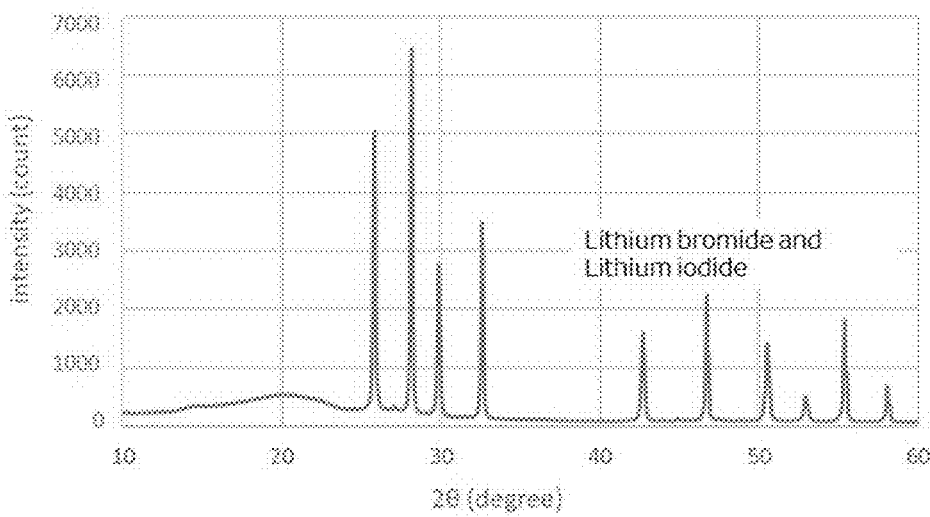
[Fig. 4]
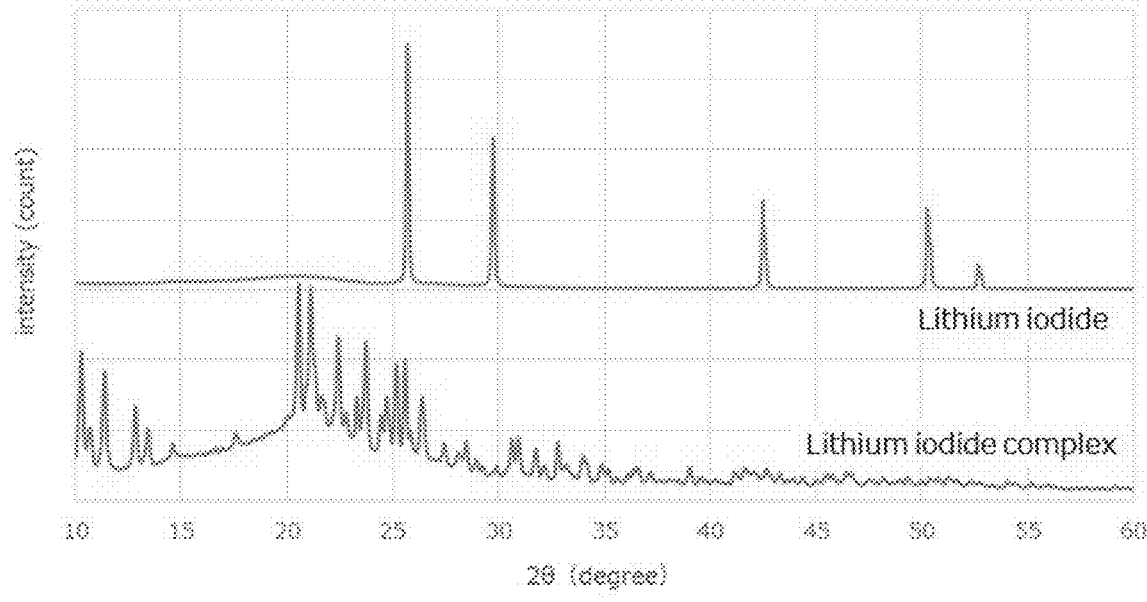

[Fig. 5]
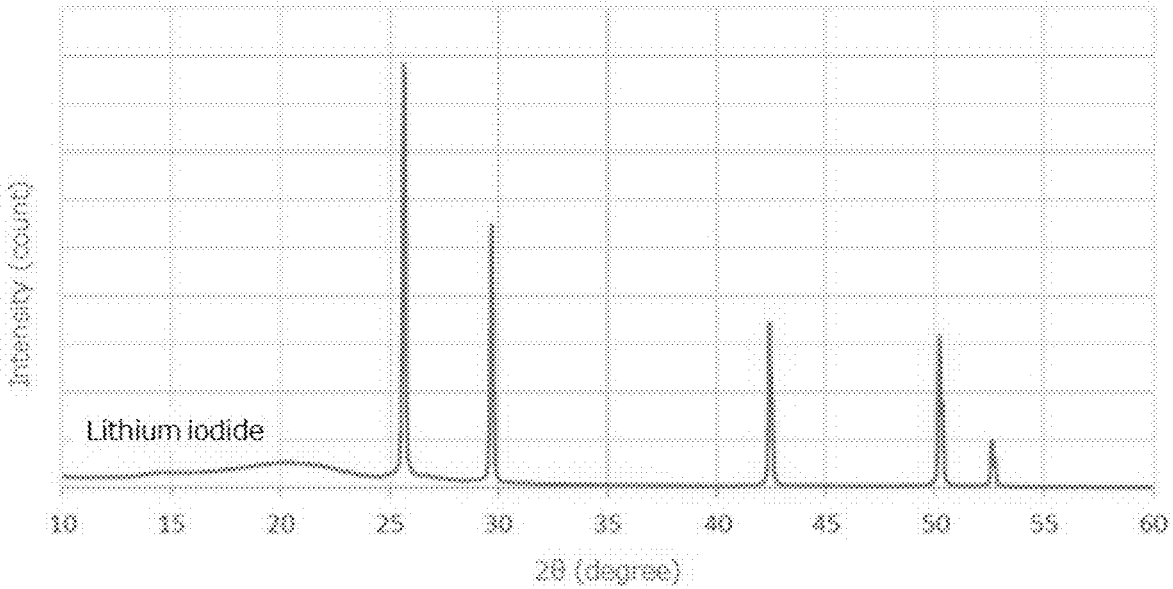
[Fig. 6]
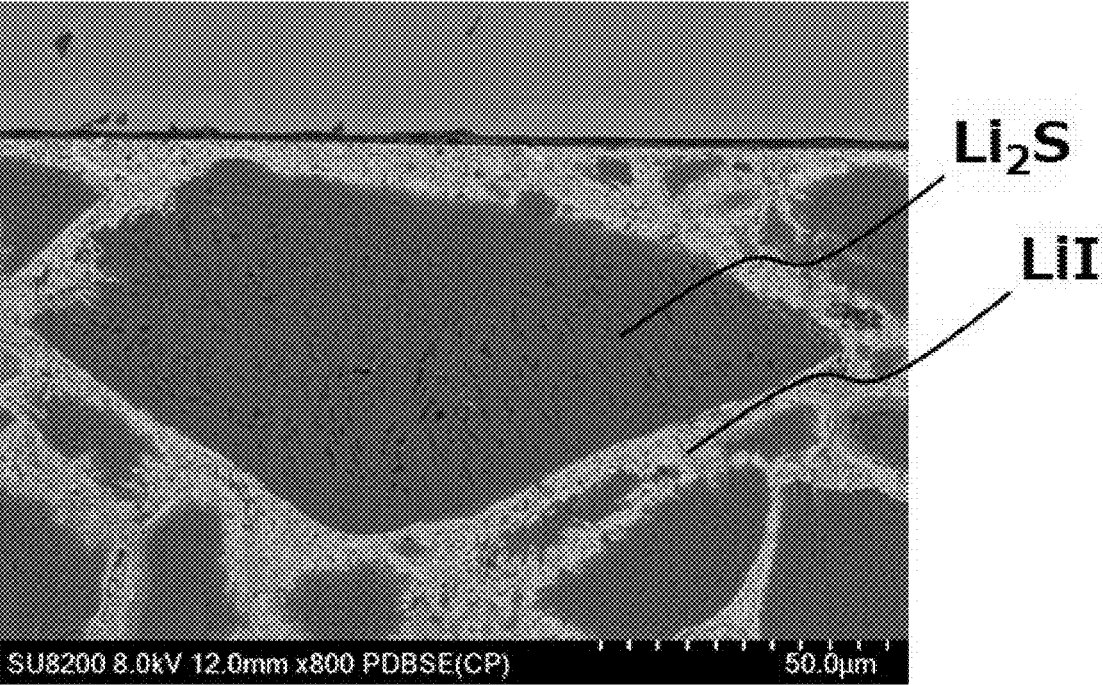

[Fig. 7]
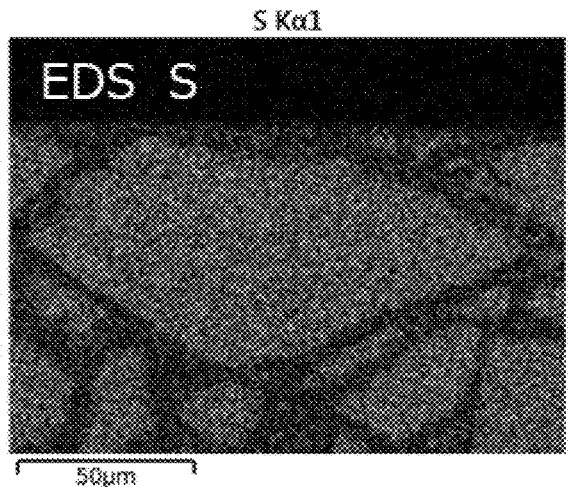
[Fig. 8]
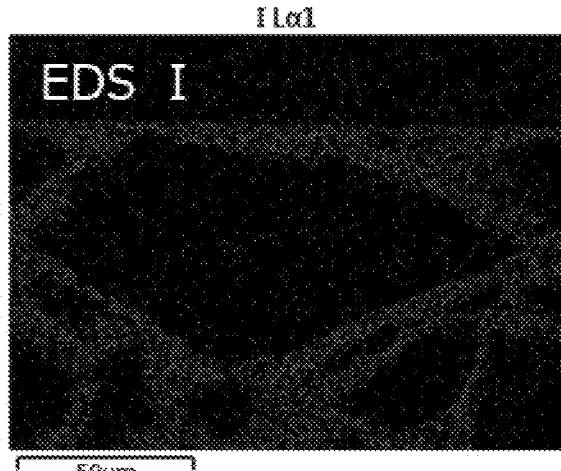

METHOD FOR PRODUCING LITHIUM HALIDE COMPOUND

TECHNICAL FIELD

The present invention relates to a method for producing a lithium halide compound.

BACKGROUND ART

With the rapid spread of information-related devices and communication devices such as personal computers, video cameras, and cellular phones in recent years, the development of batteries to be used as power sources thereof has been emphasized. In the past, an electrolytic solution containing a flammable organic solvent has been used in batteries used for such applications, but batteries in which the electrolytic solution is replaced with a solid electrolyte layer have been developed because the safety device can be simplified by completely solidifying the battery without using a flammable organic solvent in the battery, and the production cost and productivity are excellent.

As a solid electrolyte used for the solid electrolyte layer, a sulfide solid electrolyte has been conventionally known. For example, it is known that a glass ceramic electrolyte having high ion conductivity can be obtained by reacting lithium sulfide with phosphorus sulfide to produce sulfide glass and subjecting the sulfide glass to heat treatment (see, for example, PTL 1). In addition, along with the demand for higher ion conductivity, a production method using lithium halide as a sulfide solid electrolyte containing a halogen atom is also known (for example, see PTL 2).

Lithium halide used as a raw material for producing a sulfide solid electrolyte containing a halogen atom is generally produced as a hydrate because an aqueous raw material is used in a synthesis process or a reaction is performed in water (for example, see PTLs 3 and 4). When the lithium halide contains water, the ion conductivity of the sulfide solid electrolyte may decrease. Therefore, it is necessary to remove water from the lithium halide, and a method of removing water by azeotropy with an organic solvent and drying (for example, see PTL 4), a method of removing water by heating under reduced pressure (for example, see PTLs 5 and 6), and the like have been studied. However, in any case, it is not easy to remove water from the lithium halide hydrate.

Therefore, a method for producing lithium halide such as anhydrous lithium halide without removing water has been studied. For example, there is disclosed a method in which lithium sulfide is reacted with a halogen molecule in a solvent such as an aromatic hydrocarbon in which an alkali metal sulfide is hardly dissolved while using a pulverizer (for example, see PTL 7).

CITATION LIST

Patent Literature

PTL 1: JP 2005-228570 A
PTL 2: JP 2013-201110 A
PTL 3: JP 2013-103851 A
PTL 4: JP 2013-256416 A
PTL 5: JP 2014-65637 A
PTL 6: JP 2014-65638 A
PTL 7: WO 2017/159665 A

SUMMARY OF INVENTION

Technical Problem

The present invention has been made in view of such circumstances, and an object thereof is to provide a method for producing a lithium halide compound having a low water content, particularly lithium bromide and lithium iodide, with high reaction efficiency and industrially advantageously without accompanying a step of directly removing water.

Solution to Problem

A method for producing a lithium halide compound according to the present invention includes mixing lithium sulfide, a halogen molecule of at least one of bromine and iodine, and a first solvent, and removing the solvent, wherein the first solvent is a solvent that dissolves a lithium halide containing the same halogen element as the halogen molecule.

Advantageous Effects of Invention

According to the present invention, it is possible to provide a method for industrially advantageously producing a lithium halide compound having a low water content, particularly lithium bromide and lithium iodide, at a high reaction efficiency without accompanying a step of directly removing water.

BRIEF DESCRIPTION OF DRAWINGS

FIG. 1 is an X-ray diffraction spectrum of lithium sulfide used in Example 1 and lithium iodide obtained in Example 1.

FIG. 2 is an X-ray diffraction spectrum of the lithium halide complex and lithium iodide obtained in Example 2.

FIG. 3 is an X-ray diffraction spectrum of lithium bromide and lithium iodide obtained in Example 3.

FIG. 4 is an X-ray diffraction spectrum of the lithium iodide complex and lithium iodide obtained in Example 4.

FIG. 5 is an X-ray diffraction spectrum of lithium iodide obtained in Example 5.

FIG. 6 is a scanning electron microscope (SEM) image of the sample obtained in Comparative Example 1.

FIG. 7 is an EDS image of a sulfur element constituting the sample obtained in Comparative Example 1.

FIG. 8 is an EDS image of an iodine element constituting the sample obtained in Comparative Example 1.

DESCRIPTION OF EMBODIMENTS

Hereinafter, an embodiment of the present invention (hereinafter, may be referred to as "the present embodiment") will be described. In the description herein, the numerical values of the upper limit and the lower limit related to the numerical ranges of "X or more" and "Y or less", and "X to Y" are numerical values that can be arbitrarily combined, and the numerical values of the Examples can also be used as the numerical values of the upper limit and the lower limit.

(Findings Obtained by the Inventor to Arrive at the Present Invention)

As a result of intensive studies to solve the above-mentioned problems, the present inventors have found the following matters and completed the present invention.

As described in paragraph [0013] of PTL 7, it is known that when an alkali metal sulfide is reacted with a halogen molecule, by employing a method of pulverizing the alkali metal sulfide using a pulverizer, the surface of the alkali metal sulfide is scraped, and the halogen molecule is easily reacted. On the other hand, since this method is based on the premise that a pulverizer is used to promote the reaction, the reaction is significantly delayed when the pulverizer is not used. As a result of intensive studies on this phenomenon by the present inventors, it has been found that the cause is that lithium halide, which is a reaction product obtained by a primary reaction between the alkali metal sulfide and the halogen molecule, is deposited on the surface of the alkali metal sulfide.

Therefore, the present inventors have considered that, as a method of not using a pulverizer or reducing the use of a pulverizer as much as possible, the generated lithium halide may be dissolved in a solvent to expose the newly formed surface of lithium sulfide and promote the reaction with the halogen molecule, and have studied the change of the solvent type.

As a property required for the solvent to be used, a property of dissolving lithium halide, particularly lithium bromide and lithium iodide is important in order to reduce deposition of lithium halide on the surface of the alkali metal sulfide. On the other hand, it is empirically known that a solvent capable of dissolving lithium bromide and lithium iodide does not easily dissolve solid iodine. Therefore, the use of a solvent capable of dissolving iodine in particular was examined.

Based on the above investigation, it has been found that the reaction of lithium sulfide and a halogen molecule proceeds without delay even without using a pulverizer by selecting a solvent that dissolves lithium halide as a solvent and mixing lithium sulfide and the halogen molecule in the solvent.

[Method for Producing Lithium Halide Compound]

A method for producing a lithium halide compound according to a first aspect of the present embodiment is a method for producing a lithium halide compound, the method including: mixing lithium sulfide, a halogen molecule of at least one of bromine and iodine, and a first solvent; and removing the first solvent, wherein the first solvent is a solvent that dissolves a lithium halide containing the same halogen element as the halogen molecule.

In PTL 7, there is disclosed that lithium halide such as anhydrous lithium halide can be produced without removing water by reacting lithium sulfide with a halogen molecule in a solvent such as an aromatic hydrocarbon in which an alkali metal sulfide is hardly dissolved. In this respect, lithium halide can be produced more easily than in the conventional methods as described in PTLs 3 to 6. However, as described above, the method disclosed in PTL 7 is based on the premise that a pulverizer is used, and is not industrially advantageous because of its poor mass productivity. In addition, when a pulverizer is not used, there is a problem that lithium halide is deposited on the surface of the alkali metal sulfide and the reaction is remarkably delayed.

According to the first aspect of the present invention, by adopting a solvent that dissolves a lithium halide corresponding to a halogen molecule used as a raw material, the lithium halide that is deposited on the surface of lithium sulfide by a reaction between lithium sulfide and a halogen molecule is dissolved in the solvent, thereby suppressing the deposition of the lithium halide on the surface of lithium sulfide and enabling the reaction between the lithium sulfide with which the newly formed surface is always exposed and the halogen molecule to occur and promote the reaction. In addition, by the promotion of the reaction, the reaction between the lithium sulfide and the halogen molecule can be progressed only by mixing without pulverization, and thus pulverization is not necessary, and the production method is industrially advantageous.

Further, in the first aspect, the halogen element of the halogen molecule used as the raw material, the halogen element in the lithium halide in which the first solvent can be dissolved, and the halogen element in the obtained lithium halide compound are respectively corresponding to each other, that is, are the same element.

When bromine is used as the halogen molecule, the lithium halide in which the first solvent can be dissolved is lithium bromide, and the resulting lithium halide compound is a lithium bromide compound. When iodine is used as the halogen molecule, it is the same as the bromine molecule. Further, when bromine and iodine atoms are used as halogen molecule, the lithium halide in which the first solvent can be dissolved is lithium bromide and lithium iodide, and the resulting lithium halide compound is a lithium bromide compound and a lithium iodide compound.

A method for producing a lithium halide compound according to a second aspect of the present embodiment is a method for producing a lithium halide compound, including: mixing a lithium sulfide, a halogen molecule, and a second solvent; further adding and mixing the first solvent; and removing the second solvent, wherein the second solvent is a solvent that does not dissolve the lithium halide containing the same halogen element as the halogen molecule.

A second aspect is characterized primarily in the first aspect by mixing the lithium sulfide and the halogen molecule using a second solvent before using the first solvent, then adding and mixing the first solvent, and removing the second solvent. As in the first aspect, the halogen element of the halogen molecule, the halogen element of the lithium halide in which the second solvent does not dissolve, and the halogen element of the resulting lithium halide compound are the same species.

According to the second aspect, by using the second solvent before using the first solvent, it is possible to improve the reactivity of a halogen molecule, particularly iodine, which is hardly dissolved in the first solvent. If the first solvent dissolves even a trace amount of iodine, it is not necessary to use the second solvent. However, as described above, there is an empirical knowledge that a solvent which easily dissolves lithium halide simultaneously has a property of hardly dissolving the halogen molecule, particularly iodine. In other words, it can be said that the solvent which does not dissolve lithium halide simultaneously has a property of dissolving the halogen molecule, particularly iodine. In addition, by using the second solvent which dissolves the halogen molecule, particularly iodine, the reaction with lithium sulfide easily proceeds even when iodine which is a solid raw material having low reactivity is used, and the reaction efficiency can be improved.

In view of the above findings, it can be found that the use of the second solvent has an advantageous effect in terms of improving the reactivity of the halogen molecule, particularly iodine, and improving the reaction efficiency. In addition, by using the second solvent, the dispersibility of lithium sulfide and the halogen molecule used as raw materials is increased, and further, by adding the first solvent, a secondary effect that the reactivity can be improved is also obtained.

Regarding the removal of the solvent, in the second aspect, the second solvent is removed, but in the first aspect, the first solvent is removed, and as a result, all the solvent used in the production method of the present embodiment is removed.

A method for producing a lithium halide compound according to a third aspect of the present embodiment is a method for producing a lithium halide compound, in which the lithium halide compound includes a lithium halide complex.

The lithium halide complexes are not only lithium halides, i.e. lithium bromide or lithium iodide, but also complexes thereof with a solvent. The first solvent has a property of dissolving a lithium halide, and as the solvent having the property, a solvent having a hetero atom such as a nitrogen atom in its molecule is preferably used as described later. In this case, it is defined that the hetero atom can form a complex (also referred to as "lithium halide complex") in which the hetero atom is coordinated (bonded) with an atom constituting the lithium halide, particularly a lithium atom.

In the third aspect, the inclusion of the lithium halide complex means that the contribution of the halogen molecule in the reaction between lithium sulfide and the halogen molecule is improved by using such a first solvent, and the reaction can be promoted to further reduce the remaining halogen molecule, so that the reaction efficiency is improved and high reaction efficiency is obtained.

A method for producing a lithium halide compound according to a fourth aspect of the present embodiment is a method for producing a lithium halide compound, in which the first solvent has a solubility of lithium bromide and lithium iodide of 1 g/L or more. The property of not dissolving lithium halide specifically defines that the solubility of lithium halide of lithium bromide and lithium iodide is 1 g/L or more.

Since the first solvent has such a property, the deposition of lithium halide on the surface of lithium sulfide can be suppressed, and the reaction between the lithium sulfide with which the newly formed surface is always exposed and the halogen molecule can be caused to promote the reaction, so that the reaction efficiency is improved.

A method for producing a lithium halide compound according to a fifth aspect of the present embodiment is a method for producing a lithium halide compound, in which the second solvent has a solubility of lithium bromide and lithium iodide of less than 1 g/L. The property of dissolving lithium halide specifically defines that the solubility of lithium halide of lithium bromide and lithium iodide is less than 1 g/L.

By having such a property of the second solvent, it becomes easy to obtain an effect of improving the reactivity of the above-described halogen molecule that is hardly dissolved in the first solvent, in particular, iodine. As a result, the reaction between the lithium sulfide and the halogen molecule is promoted and the reaction efficiency is improved.

A method for producing a lithium halide compound according to a sixth aspect of the present embodiment is a method for producing a lithium halide compound, further including washing and removing a sulfur molecule. By the reaction between the lithium sulfide and the halogen molecule, a sulfur molecule is produced as a by-product together with the lithium halide. According to the sixth aspect, it is possible to produce a lithium halide compound with high purity by washing and removing the by-produced sulfur molecule.

A method for producing a lithium halide compound according to a seventh aspect of the present embodiment is a method for producing a lithium halide compound, in which a third solvent is used in the washing and removing.

A method for producing a lithium halide compound according to an eighth aspect of the present embodiment is a method for producing a lithium halide compound, in which the third solvent is removed by at least one treatment selected from filtration and heating under reduced pressure.

The washing and removing of the sulfur molecule can be performed by washing using the third solvent, and the removal of the third solvent used for washing can be performed by a treatment such as filtration, both of which are easy methods, and thus the sulfur molecule as a by-product can be easily removed.

A method for producing a lithium halide compound according to a ninth aspect of the present embodiment is a method for producing a lithium halide compound, in which the first solvent is an aprotic solvent having at least one functional group selected from an ester group, an ether group, and an amino group. As described above, a lithium halide complex can be formed by employing, as the first solvent, a solvent containing a hetero atom such as a nitrogen atom or an oxygen atom, more specifically, an aprotic solvent having a functional group containing such a hetero atom. Then, by improving the contribution of the halogen molecule in the reaction between lithium sulfide and the halogen molecule, the reaction can be promoted and the remaining halogen molecule can be further reduced, so that the reaction efficiency is improved and high reaction efficiency is obtained.

A method for producing a lithium halide compound according to a tenth aspect of the present embodiment is a method for producing a lithium halide compound, in which the second medium is at least one of an aromatic hydrocarbon and an aliphatic hydrocarbon, and a method for producing a lithium halide compound according to an eleventh aspect is a method for producing a lithium halide compound, in which the second solvent has a boiling point of 150° C. or lower.

As described above, as the second solvents, the effect of improving the reactivity of the halogen molecule, particularly iodine, which is difficult to dissolve in the first solvent is easy to be obtained, and aromatic hydrocarbons, aliphatic hydrocarbons, and those having a boiling point of 150° C. or higher are advantageous as those in which the effect is easy to appear. By employing such a second solvent, the reaction between the lithium sulfide and the halogen molecule is promoted, and the reaction efficiency is improved.

A method for producing a lithium halide compound according to a twelfth aspect of the present embodiment is a method for producing a lithium halide compound, in which the third solvent has a solubility of a sulfur molecule of 0.1 g/L or more, and a method for producing a lithium halide compound according to a thirteenth aspect is a method for producing a lithium halide compound, in which the third solvent is at least one of the aromatic hydrocarbon and the aliphatic hydrocarbon.

The third solvent is used for washing and removing the sulfur molecule by-produced in the reaction between the lithium sulfide and the halogen molecule, and by employing a solvent having the above-mentioned solubility, specifically, an aromatic hydrocarbon, an aliphatic hydrocarbon or the like, a good washing and removing effect can be obtained, and lithium halide having a high product purity can be easily obtained.

A method for producing a lithium halide compound according to a fourteenth aspect of the present embodiment is a method for producing a lithium halide compound, in which the second solvent and the third solvent are the same.

As the second solvent and the third solvent, an aromatic hydrocarbon and an aliphatic hydrocarbon are preferably used as in the tenth aspect and the thirteenth aspect. When the same kind of solvent is used, the treatment is easier than when different kinds of solvents are used, and the production control is more efficient.

Hereinafter, the production method of the present embodiment will be described in more detail based on the above-described embodiment.

(Lithium Sulfide)

The lithium sulfide used in the production method of the present embodiment is usually in the form of particles, and may be a commercially available product or a product produced by a known method. Lithium sulfide is one of alkali metal sulfides, and the ion conductivity of the sulfide solid electrolyte tends to be improved by using a light alkali metal. Therefore, the lithium halide obtained by the production method of the present embodiment using lithium sulfide as a raw material is a light metal among alkali metals, and is an effective compound in terms of improvement in ion conductivity.

Examples of known methods for obtaining lithium sulfide include a method in which lithium sulfide is synthesized by reacting lithium hydroxide and hydrogen sulfide at 70° C. to 300° C. in a hydrocarbon-based organic solvent to produce lithium hydrosulfide and then dehydrodesulfurizing the reactant (JP 2010-163356 A) and a method of synthesizing lithium sulfide by reacting lithium hydroxide and hydrogen sulfide at 130° C. or higher and 445° C. or lower (JP 9-278423 A).

The average particle diameter ($D_{50}$) of the lithium sulfide used in the production method of the present embodiment is preferably 10 μm or more and 2000 μm or less, more preferably 30 μm or more and 1500 μm or less, and still more preferably 50 μm or more and 1000 μm or less. In the description herein, the average particle diameter ($D_{50}$) is the particle diameter at which 50% of the total particle diameter is reached by sequentially integrating from the smallest particle when a particle size distribution integration curve is drawn, and the volume distribution is the average particle diameter that can be measured using, for example, a laser diffraction/scattering particle size distribution measuring apparatus.

The amount of water contained in the lithium sulfide as an impurity is preferably small from the viewpoint of reducing the amount of water in the obtained lithium halide, and further reducing the amount of water in the solid electrolyte when the lithium halide is used as a raw material of the sulfide solid electrolyte, and suppressing a decrease in ion conductivity and a decrease in battery performance due to water. The amount of water contained in the lithium sulfide is preferably 1.5% by mass or less, more preferably 1% by mass or less, and still more preferably 0.5% by mass or less. The lower limit is not particularly limited because it is preferably as small as possible, but is usually about 0.1% by mass. In the description herein, the amount of water in lithium sulfide is a value measured under the conditions of 280° C. by a vaporization method using a Karl Fischer moisture meter.

(Halogen Molecule)

The halogen molecule used in the production method of the present embodiment is at least one of bromine and iodine, and is a molecule represented by the following general formula (1).

$$X_2 \tag{1}$$

(In the general formula (1), X is a bromine element and an iodine element.)

As the halogen molecule, fluorine ($F_2$), chlorine ($Cl_2$), bromine ($Br_2$), and iodine ($I_2$) are generally preferable, and among them, bromine ($Br_2$) and iodine ($I_2$) are applicable. In the production method of the present embodiment, the halogen molecule may be used singly or in combination of two or more kinds thereof. That is, bromine may be used alone, iodine may be used alone, or bromine and iodine may be used in combination. In the production method of the present embodiment, at least one of bromine and iodine is used as the halogen molecule, but it is also applicable to fluorine and chlorine which are other halogen molecules.

In the production method of the present embodiment, lithium sulfide and a halogen molecule react with each other by a reaction formula shown as the following reaction formula (2). Therefore, the amount of the halogen molecule used may be the same molar amount with respect to 1 mol of lithium sulfide, and when a plurality of types of halogen molecules are used, the total number of moles of the plurality of types of halogen molecules may be the same molar amount.

$$Li_2S + X_2 \rightarrow 2LiX + S \tag{2}$$

(In the formula (2), $X_2$ is a halogen molecule of bromine and iodine.)

As described above and shown in the reaction formula (2), lithium halide is produced by the reaction between lithium sulfide and the halogen molecule, but the lithium halide is produced so as to be deposited on the surface of the lithium sulfide, so that further reaction of the lithium sulfide hardly proceeds. According to the production method of the present embodiment, since the first solvent for dissolving the lithium halide is used, the lithium halide is not deposited on the surface of the lithium sulfide, and a newly formed surface is always exposed, so that the reaction is promoted.

As shown in the above reaction formula (2), sulfur is produced as a by-product. Lithium halide can be obtained by, for example, a reaction between lithium hydroxide and hydrogen halide in addition to the methods disclosed in PTLs 3 and 4, but water is produced as a by-product.

By selecting lithium sulfide and a halogen molecule as raw materials, which are easily available and can be applied to mass production, water is not obtained as a by-product, and application to industrialization becomes possible. In these respects, the combination of lithium sulfide and a halogen molecule is extremely useful.

(First Solvent)

The first solvent used in the production method of the present embodiment is a solvent that dissolves lithium halide. The lithium halide varies depending on the type of halogen molecule used together with lithium sulfide, and specifically, lithium bromide and lithium iodide may be included. That is, the first solvent has a property of dissolving these lithium halides.

The first solvents are not particularly limited as long as they can dissolve the lithium halides of lithium bromide and lithium iodide described above, and examples thereof include solvents having a solubility (20° C.) of preferably 1 g/L or more, more preferably 3 g/L or more, and still more preferably 5 g/L or more. When the solubility of the lithium halide is within the above range, the lithium halide produced by the reaction between the lithium sulfide and the halogen molecule is rapidly dissolved in the first solvent without being deposited on the surface of the lithium sulfide, and thus the deposition can be further suppressed. The upper limit of the solubility is not particularly limited and is usually about 1000 g/L or less.

In the description herein, the solubility of lithium halide is measured by the following method. Lithium halide was added to a solvent and mixed well at 20° C. It was visually observed that lithium halide which could not be dissolved in the solvent was present in the solution. Next, the obtained solution was subjected to inductively coupled plasma (ICP) emission spectrometry using an inductively coupled plasma (ICP) emission spectrophotometer. The content of lithium in the solution thus obtained, that is, lithium dissolved in the solvent was measured, and the solubility (g/L) of the lithium halide was calculated.

Preferable examples of the first solvent include a complexing agent. The complexing agent is a compound capable of forming a complex (also referred to as a "lithium halide complex") coordinated (bonded) with a lithium atom, a sulfur atom, and a halogen atom, particularly a lithium atom, contained in the lithium sulfide and the halogen molecule used in the production method of the present embodiment or the lithium halide obtained by the reaction thereof. The complexing agent is not particularly limited as long as it has such performance, and is preferably a compound containing in particular an atom having high affinity for a lithium atom, for example, a hetero atom such as a nitrogen atom, an oxygen atom, or a chlorine atom, and more preferably a compound having a group containing such a hetero atom.

By using the complexing agent as the first solvent, the reaction between the lithium sulfide and the halogen molecule can be promoted and the remaining halogen molecule can be further reduced, so that the reaction efficiency is improved and high reaction efficiency can be obtained. Further, by using a complexing agent as the first solvent, a lithium halide obtained by the reaction between lithium sulfide and a halogen atom is dissolved as a complex in the solvent, and by removing the solvent, the obtained lithium halide becomes porous, and as a result, a sulfide solid electrolyte having a higher ionic conductivity is easily obtained.

In the case where a complexing agent is used as the first solvent in the production method of the present embodiment, what is obtained by mixing and removing the solvent is a complex composed of the lithium halide and the complexing agent, which is generated by the above-described coordination (bonding), and cannot be strictly said to be lithium halide. That is, the lithium halide compound obtained by the production method of the present embodiment may include not only lithium halide but also a lithium halide complex, and when a plurality of kinds of halogen molecules are used, a compound referred to as a lithium halide composite which simultaneously contains halogen atoms derived from the plurality of kinds of halogen molecules may also be included. Since any of these compounds can be suitably used as a raw material of a sulfide solid electrolyte, the lithium halide compound obtained by the production method of the present embodiment may be any of a lithium halide, a lithium halide complex, or a lithium halide composite.

As the hetero atom, a nitrogen atom and an oxygen atom are more preferable, and as the group containing these hetero atoms, an amino group, an amido group, a nitro group and a nitrile group are preferable as the group containing a nitrogen atom, and an amino group is more preferable. As the group containing an oxygen atom, an ester group and an ether group are preferable, and an ester group is more preferable. Therefore, in the production method of the present embodiment, a solvent particularly preferably used as the first solvent is a complexing agent, particularly an aprotic solvent having at least one functional group selected from an ester group, an ether group, and an amino group.

Examples of the complexing agent having an amino group include amine compounds such as an aliphatic amine, an alicyclic amine, a heterocyclic amine, and an aromatic amine, and these may be used alone or in combination of two or more.

Typical preferred examples of the aliphatic amine include aliphatic primary diamines such as ethylenediamine, diaminopropane, and diaminobutane; aliphatic secondary diamines such as N,N'-dimethylethylenediamine, N,N'-diethylethylenediamine, N,N'-dimethyldiaminopropane, and N,N'-diethyldiaminopropane; and aliphatic tertiary diamines such as N,N,N',N'-tetramethyldiaminomethane, N,N,N',N'-tetramethylethylenediamine, N,N,N',N'-tetraethylethylenediamine, N,N,N',N'-tetramethyldiaminopropane, N,N,N',N'-tetraethyldiaminopropane, N,N,N',N'-tetramethyldiaminobutane, N,N,N',N'-tetramethyldiaminopentane, and N,N,N',N'-tetramethyldiaminohexane. Here, in the exemplification in the description herein, for example, in the case of diaminobutane, unless otherwise specified, in addition to isomers related to the position of an amino group such as 1,2-diaminobutane, 1,3-diaminobutane, and 1,4-diaminobutane, all isomers such as linear and branched isomers are included in butane.

The number of carbon atoms of the aliphatic amine is preferably 2 or more, more preferably 4 or more, and still more preferably 6 or more, and the upper limit thereof is preferably 10 or less, more preferably 8 or less, and still more preferably 7 or less. In addition, the number of carbon atoms of the aliphatic hydrocarbon group in the aliphatic amine is preferably 2 or more, and the upper limit thereof is preferably 6 or less, more preferably 4 or less, and still more preferably 3 or less.

Typical preferred examples of the alicyclic amine include alicyclic diamines such as alicyclic primary diamines such as cyclopropanediamine and cyclohexanediamine; alicyclic secondary diamines such as bisaminomethylcyclohexane; alicyclic tertiary diamines such as N,N,N',N'-tetramethylcyclohexanediamine and bis(ethylmethylamino)cyclohexane; and heterocyclic diamines such as heterocyclic primary diamines such as isophoronediamine; heterocyclic secondary diamines such as piperazine and dipiperidylpropane; and heterocyclic tertiary diamines such as N,N-dimethylpiperazine and bismethylpiperidylpropane.

The number of carbon atoms of the alicyclic amine and the heterocyclic amine is preferably 3 or more and more preferably 4 or more, and the upper limit thereof is preferably 16 or less and more preferably 14 or less.

Further, typical preferred examples of the aromatic amine include aromatic primary diamines such as phenyldiamine, tolylenediamine, and naphthalenediamine; aromatic secondary diamines such as N-methylphenylenediamine, N,N'-dimethylphenylenediamine, N,N'-bismethylphenylphenylenediamine, N,N'-dimethylnaphthalenediamine, and N-naphthylethylenediamine; and aromatic tertiary diamines such as N,N-dimethylphenylenediamine, N,N,N',N'-tetramethylphenylenediamine, N,N,N',N'-tetramethyldiaminodiphenylmethane, and N,N,N',N'-tetramethylnaphthalenediamine.

The number of carbon atoms of the aromatic amine is preferably 6 or more, more preferably 7 or more, and still more preferably 8 or more, and the upper limit thereof is preferably 16 or less, more preferably 14 or less, and still more preferably 12 or less.

The amine compound used in the present embodiment may be substituted with a substituents such as an alkyl group, an alkenyl group, an alkoxyl group, a hydroxy group, or a cyano group, or a halogen atom.

Although diamine is exemplified as a specific example, the amine compound that can be used in the present embodiment is not limited to diamine, and for example, aliphatic monoamines corresponding to various diamines such as trimethylamine, triethylamine, ethyldimethylamine, and the aforementioned aliphatic diamine; piperidine compounds such as piperidine, methylpiperidine, and tetramethylpiperidine; pyridine compounds such as pyridine and picoline; morpholine compounds such as morpholine, methylmorpholine, and thiomorpholine; imidazole compounds such as imidazole and methylimidazole; alicyclic monoamines such as monoamines corresponding to the aforementioned alicyclic diamines; heterocyclic monoamines corresponding to the aforementioned heterocyclic diamines; monoamines such as aromatic monoamines corresponding to the aforementioned aromatic diamines; as well as polyamines having three or more amino groups such as diethylenetriamine, N,N',N''-trimethyldiethylenetriamine, N,N,N',N'',N''-pentamethyldiethylenetriamine, triethylenetetramine, N,N'-bis [(dimethylamino)ethyl]-N,N'-dimethylethylenediamine, hexamethylenetetramine, and tetraethylenepentamine can be used.

Among them, a tertiary amine having a tertiary amino group as an amino group is preferable, a tertiary diamine having two tertiary amino groups is more preferable, a tertiary diamine having two tertiary amino groups at both terminals is still more preferable, and an aliphatic tertiary diamine having tertiary amino groups at both terminals is still more preferable, from the viewpoint of promoting the reaction between lithium sulfide and a halogen molecule to improve the reaction efficiency, rapidly dissolving lithium halide, and suppressing the deposition of lithium sulfide on the surface. In the amine compound, as the aliphatic tertiary diamine having a tertiary amino group at both terminals, tetramethylethylenediamine, tetraethylethylenediamine, tetramethyldiaminopropane, and tetraethyldiaminopropane are preferable, and in consideration of availability and the like, tetramethylethylenediamine (also referred to as "TMEDA") and tetramethyldiaminopropane (also referred to as "TMPDA") are preferable.

In addition, although not particularly exemplified, a compound containing a nitrogen atom as a hetero atom and having a group other than an amino group, for example, a group such as an amido group, a nitro group, or a nitrile group can also obtain the same effects as those of a compound containing an amino group.

Examples of the complexing agent having the above-described ether group as a group containing an oxygen atom include ether compounds such as an aliphatic ether, an alicyclic ether, a heterocyclic ether, and an aromatic ether, and these may be used alone or in combination of two or more thereof.

Examples of the aliphatic ether include monoethers such as dimethyl ether, diethyl ether, diisopropyl ether, dibutyl ether, and tert-butyl methyl ether; diethers such as dimethoxymethane, dimethoxyethane, diethoxymethane, and diethoxyethane; polyethers having three or more ether groups such as diethylene glycol dimethyl ether (diglyme) and triethylene oxide glycol dimethyl ether (triglyme); and ethers containing a hydroxy group such as diethylene glycol and triethylene glycol.

The number of carbon atoms of the aliphatic ether is preferably 2 or more, more preferably 3 or more, and still more preferably 4 or more, and the upper limit thereof is preferably 10 or less, more preferably 8 or less, and still more preferably 6 or less.

In addition, the number of carbon atoms of the aliphatic hydrocarbon group in the aliphatic ether is preferably 1 or more, and the upper limit thereof is preferably 6 or less, more preferably 4 or less, and still more preferably 3 or less.

Examples of the alicyclic ether include ethylene oxide, propylene oxide, tetrahydrofuran, tetrahydropyran, dimethoxytetrahydrofuran, cyclopentyl methyl ether, dioxane, and dioxolane, and further, examples of the heterocyclic ether include furan, benzofuran, benzopyran, dioxene, dioxine, morpholine, methoxyindole, and hydroxymethyldimethoxypyridine.

The number of carbon atoms of the alicyclic ether and the heterocyclic ether is preferably 3 or more and more preferably 4 or more, and the upper limit thereof is preferably 16 or less and more preferably 14 or less.

Further, examples of the aromatic ether include methyl phenyl ether (anisole), ethyl phenyl ether, dibenzyl ether, diphenyl ether, benzyl phenyl ether, and naphthyl ether.

The number of carbon atoms of the aromatic ether is preferably 7 or more, and more preferably 8 or more, and the upper limit thereof is preferably 16 or less, more preferably 14 or less, and still more preferably 12 or less.

The ether compound used in the present embodiment may be substituted with a substituents such as an alkyl group, an alkenyl group, an alkoxyl group, a hydroxy group, or a cyano group, or a halogen atom.

The ether compound used in the present embodiment is preferably an aliphatic ether, and more preferably dimethoxyethane or tetrahydrofuran, from the viewpoint of improving the reaction efficiency by promoting the reaction between lithium sulfide and the halogen molecule, and rapidly dissolving the lithium halide to suppress the deposition of lithium sulfide on the surface.

Examples of the complexing agent having the above-described ester group as a group containing an oxygen atom include ester compounds such as aliphatic esters, alicyclic esters, heterocyclic esters, and aromatic esters, and these may be used alone or in combination of two or more thereof.

Examples of the aliphatic ester include formate esters such as methyl formate, ethyl formate, and triethyl formate; acetate esters such as methyl acetate, ethyl acetate, propyl acetate, isopropyl acetate, butyl acetate, and isobutyl acetate; propionate esters such as methyl propionate, ethyl propionate, propyl propionate, and butyl propionate; oxalate esters such as dimethyl oxalate and diethyl oxalate; malonate esters such as dimethyl malonate and diethyl malonate; and succinate esters such as dimethyl succinate and diethyl succinate.

The number of carbon atoms of the aliphatic ester is preferably 2 or more, more preferably 3 or more, and still more preferably 4 or more, and the upper limit thereof is preferably 10 or less, more preferably 8 or less, and still more preferably 7 or less. In addition, the number of carbon atoms of the aliphatic hydrocarbon group in the aliphatic ester is preferably 1 or more and more preferably 2 or more, and the upper limit thereof is preferably 6 or less, more preferably 4 or less, and still more preferably 3 or less.

Examples of the alicyclic ester include methyl cyclohexanecarboxylate, ethyl cyclohexanecarboxylate, dimethyl cyclohexanedicarboxylate, dibutyl cyclohexanedicarboxylate, and dibutyl cyclohexenedicarboxylate, and further, examples of the heterocyclic ester include methyl pyridinecarboxylate, ethyl pyridinecarboxylate, propyl pyridinecarboxylate, methyl pyrimidinecarboxylate, ethyl pyrimidinecarboxylate, and lactones such as acetolactone, propiolactone, butyrolactone, and valerolactone.

The number of carbon atoms of the alicyclic ester and the heterocyclic ester is preferably 3 or more, and more preferably 4 or more, and the upper limit thereof is preferably 16 or less and more preferably 14 or less.

Examples of the aromatic ester include benzoic acid esters such as methyl benzoate, ethyl benzoate, propyl benzoate, and butyl benzoate; phthalic acid esters such as dimethyl phthalate, diethyl phthalate, dibutyl phthalate, butyl benzyl phthalate, and dicyclohexyl phthalate; and trimellitic acid esters such as trimethyl trimellitate, triethyl trimellitate, tripropyl trimellitate, tributyl trimellitate, and trioctyl trimellitate.

The number of carbon atoms of the aromatic ester is preferably 8 or more, and more preferably 9 or more, and the upper limit thereof is preferably 16 or less, more preferably 14 or less, and still more preferably 12 or less.

The ester compound used in the present embodiment may be substituted with a substituent such as an alkyl group, an alkenyl group, an alkoxyl group, a hydroxy group, or a cyano group, or a halogen element.

The ester compound used in the present embodiment is preferably an aliphatic ester, more preferably an acetic acid ester, and particularly preferably ethyl acetate, from the viewpoint of improving the reaction efficiency by promoting the reaction between lithium sulfide and the halogen molecule, and rapidly dissolving the lithium halide to suppress the deposition of lithium sulfide on the surface.

Those listed as complexing agents preferably used as the first solvent basically form a lithium halide complex in which a hetero atom of the complexing agent and a lithium atom of lithium sulfide are coordinated (bonded). Some compounds do not form the complex, and compounds having an oxygen atom which is a hetero atom as an ester group tend to be difficult to form a complex, but the effect of improving the reaction efficiency is not inhibited even if the complex is not formed, because the compound has a property of dissolving lithium halide and a property of dissolving the halogen molecule, especially iodine, so that the remaining halogen molecule can be reduced and the reaction efficiency is improved.

In the production method of the present embodiment, the amount of the first solvent to be used is preferably 100 mL or more, more preferably 200 mL or more, still more preferably 250 mL or more, and even more preferably 300 mL or more, and the upper limit thereof is preferably 3000 mL or less, more preferably 2500 mL or less, still more preferably 2000 mL or less, and even more preferably 1550 mL or less with respect to 1 kg of the total amount of lithium sulfide and the halogen molecule. When the amount of the first solvent to be used is within the above range, the lithium halide is rapidly dissolved, and deposition of lithium sulfide on the surface is easily suppressed.

(Mixing)

The production method of the present embodiment includes mixing the lithium sulfide, the halogen molecule, and the first solvent that dissolves the lithium halide. By mixing, lithium halide is obtained by the reaction between lithium sulfide and the halogen molecule, and the obtained lithium halide is dissolved in the first solvent without being deposited on the surface of lithium sulfide, so that the newly formed surface of lithium sulfide is always in contact with the halogen molecule to promote the reaction.

When the lithium sulfide, the halogen molecule, and the first solvent that dissolves the lithium halide are mixed, there is no particular limitation on the mixing method, and the lithium sulfide, the halogen molecule, and the first solvent may be put into an apparatus capable of mixing them and mixed.

Here, since fluorine and chlorine are gases, bromine is a liquid, and iodine is a solid under normal temperature and normal pressure, for example, the halogen molecule may be supplied and mixed by a method according to the state of the halogen molecule. For example, when the halogen molecule is liquid, it may be supplied into the tank together with the first solvent; when the halogen molecule is gaseous, it may be supplied so as to be blown into the mixture of the complexing agent and lithium sulfide; and when the halogen molecule is solid, it may be supplied into the tank together with lithium sulfide.

The production method of the present embodiment is characterized by including mixing the lithium sulfide, the halogen molecule, and the first solvent, and lithium halide can be efficiently produced without using a device generally referred to as a pulverizer (without performing pulverization), such as a media type mill such as a ball mill or a bead mill. In the production method of the present embodiment, "mixing" means that it is performed by a treatment such as stirring to such an extent that "pulverization" of lithium sulfide and the halogen molecule (iodine), which are solid raw materials, does not occur. In order to shorten the mixing time for obtaining the complex or to finely divide the raw materials, the raw materials may be pulverized by a pulverizer. However, from the viewpoint of industrialization, it is preferable not to use a pulverizer, that is, not to perform pulverization. One feature of the production method of the present embodiment is that lithium halide can be produced without pulverization.

An apparatus for mixing lithium sulfide, the halogen molecule, and the first solvent may be appropriately selected depending on the scale. For example, in the case of a small scale, an apparatus such as a Schlenk equipped with a stirring element may be used, and in the case of a medium to large scale, a mechanical stirring type mixer equipped with a stirring blade in a tank may be used.

Examples of the mechanical stirring type mixer include a high-speed stirring mixer and a double-arm type mixer, and the high-speed stirring type mixer is preferably used from the viewpoint of increasing the uniformity of the raw material in the mixture of the raw material and the complexing agent and obtaining higher ion conductivity. Further, examples of the high-speed stirring type mixer include a vertical shaft rotation type mixer and a horizontal shaft rotation type mixer, and either type of mixer may be used.

Examples of the shape of the stirring blade used in the mechanical stirring type mixer include a blade type, an arm type, an anchor type, a paddle type, a full-zone type, a ribbon type, a multi-stage blade type, a double-arm type, an excavator type, a two shaft type, a flat blade type, and a C-type blade type. From the viewpoint of efficiently promoting the reaction between lithium sulfide and the halogen molecule, rapidly dissolving the obtained lithium halide, and easily suppressing the deposition of lithium sulfide on the surface, the excavator type, the flat blade type, the C-type blade type, the anchor type, the paddle type, the full-zone type, and the like are preferred, and the anchor type, the paddle type, and the full-zone type are more preferred.

The temperature condition at the time of mixing is not particularly limited, and is, for example, usually −30 to 100° C., preferably 5 to 50° C., more preferably 10 to 30° C., and still more preferably about room temperature (23° C.) (for example, about room temperature±5° C.). The mixing time is usually 0.1 to 500 hours, and is preferably 0.5 to 100 hours, more preferably 1 to 50 hours, still more preferably 2 to 25 hours, and even more preferably 3 to 10 hours from the viewpoint of efficiently and sufficiently proceeding the reaction between lithium sulfide and halogen atoms.

(Second Solvent)

In the production method of the present embodiment, in addition to the first solvent, a second solvent that does not dissolve a lithium halide can be used as a solvent other than the first solvent. As described above, the first solvent has the property of dissolving lithium halide, and empirically has the property of hardly dissolving the halogen molecule, particularly iodine. On the other hand, the second solvent has a property of not dissolving lithium halide and a property of easily dissolving the halogen molecule, particularly iodine. Therefore, it can be said that the second solvent is preferably used for improving the reactivity of iodine which is hardly dissolved in the first solvent. By using the second solvent before using the first solvent, the reaction between lithium sulfide and the halogen molecule, particularly iodine, can be promoted, so that the reaction efficiency can be improved. When bromine is used as the halogen molecule, the second solvent is not necessarily required because bromine is liquid at room temperature and can be dispersed without using the second solvent. Therefore, the second solvent is particularly effective when iodine is used as the halogen molecule.

The second solvents are solvents having a property of not dissolving lithium halide, and are not particularly limited as long as they do not dissolve lithium halide, and examples thereof include solvents having a property of a solubility (20° C.) of preferably less than 1 g/L, more preferably 0.5 g/L or less, still more preferably 0.1 g/L or less, and even more preferably 0.07 g/L or less.

When the solubility of the lithium halide is within the above range, the lithium halide produced by the reaction between the lithium sulfide and the halogen molecule is rapidly dissolved in the first solvent without being deposited on the surface of the lithium sulfide while improving the dispersion state of the lithium sulfide and the halogen molecule, and thus the deposition can be further suppressed. The lower limit is not particularly limited, and is usually 0.01 mg/L or more.

The second solvent is preferably a solvent that dissolves a halogen molecule, particularly iodine. The solubility (25° C.) thereof is preferably 0.03% by mass or more, more preferably 0.05% by mass or more, and still more preferably 0.1% by mass or more. In addition, the upper limit is not limited, and for example, solubility of 60% by mass or less, 55% by mass or less, or 10% by mass or less can be exemplified. When the solubility of iodine in the second solvent is within the above range, the effect of using the second solvent can be efficiently obtained, and even when bromine is used as another halogen molecule, the same effect can be obtained.

In the description herein, the solubility of halogen molecule is measured by the following method. 2 g of iodine was added to 3 mL of the solvent, and the solution was stirred at 25° C. for 20 minutes. 0.1 g of the supernatant liquid was weighed, 1 g of an aqueous sodium thiosulfate solution (10% by mass, $Na_2S_2O_3$) was added to the supernatant liquid, and the solution was shaken for about 1 minute to confirm that the coloring of the solution disappeared. The iodine concentration of the solution was determined by ICP emission spectrometry (high-frequency inductively coupled plasma emission spectrometry), and the solubility of iodine was calculated.

Preferred examples of the second solvent having such properties include hydrocarbon solvents such as aliphatic hydrocarbons, alicyclic hydrocarbons, and aromatic hydrocarbons; and solvents containing carbon atoms such as solvents containing carbon atoms and hetero atoms.

Examples of the aliphatic hydrocarbon include hexane, pentane, 2-ethylhexane, heptane, octane, decane, undecane, dodecane, and tridecane; examples of the alicyclic hydrocarbon include cyclohexane and methylcyclohexane; examples of the aromatic hydrocarbon include benzene, toluene, xylene, mesitylene, tert-butylbenzene, trifluoromethylbenzene, and nitrobenzene; and examples of the solvent containing a carbon atom and a hetero atom include carbon disulfide, diethyl ether, dibutyl ether, and tetrahydrofuran.

As the second solvent, one of the above-described solvents may be used alone, or a plurality of the above-described solvents may be used in combination.

Among them, hydrocarbon solvents are preferable, aromatic hydrocarbons and aliphatic hydrocarbons are more preferable, and toluene is preferable as the aromatic hydrocarbon, from the viewpoint of rapidly dissolving lithium halide and suppressing deposition of lithium sulfide on the surface.

The aliphatic hydrocarbon preferably has 2 to 8 carbon atoms, more preferably 3 to 7 carbon atoms, and still more preferably 4 to 6 carbon atoms. In addition, an alicyclic hydrocarbon is preferable, and the number of carbon atoms of the cyclic portion is preferably 3 or more and 8 or less, more preferably 4 or more and 7 or less, still more preferably 4 or more and 6 or less, and particularly preferably 6. Cyclohexane is particularly preferred as the alicyclic hydrocarbon.

The boiling point of the second solvents is preferably 150° C. or lower, and more preferably 140° C. or lower, and the lower limit thereof is not particularly limited but may be 90° C. or higher. When the boiling point is within the above range, the second solvent has an appropriate viscosity, and a good dispersion state of lithium sulfide and the halogen molecule is obtained.

The second solvent is a solvent having the property of not dissolving lithium halide, but also having the property of easily dissolving a sulfur molecule. In the production method of the present embodiment, lithium sulfide and a halogen molecule react with each other according to the reaction formula shown in the reaction formula (2), and a sulfur molecule is produced as a by-product together with lithium halide. That is, the mixture obtained by mixing lithium sulfide, the halogen molecule, the first solvent, and the second solvent also contains a sulfur molecule, and in order to obtain lithium halide, it is necessary to remove the sulfur molecule which is a by-product. Since the second solvent has a property of dissolving a sulfur molecule, the sulfur molecule dissolved in the solvent can also be removed by removing the second solvent by removing the solvent described later. Therefore, the effect of removing the sulfur molecule by washing can be expected by removing the solvent described later. From the viewpoint of improving the quality of the obtained lithium halide compound, the sulfur molecule is preferably removed by washing, as described later.

With regard to the property that the second solvent easily dissolves a sulfur molecule, more particularly, those having a sulfur-solubility (25° C.) of preferably 1 g/L or more, more preferably 0.3 g/L or more, still more preferably 0.5 g/L or more, and particularly preferably 10 g/L or more are used. Further, the upper limit of the sulfur-solubility is not particularly limited, but is, for example, 600 g/L or less, 550 g/L or less, and 100 g/L or less. In the description herein, the sulfur-solubility is measured in the following manner.

(Measurement of Sulfur-Solubility)

50 mL of a solvent was added to 10 g of sulfur in an oil bath, the temperature of the oil bath was adjusted to 25° C., and the mixture was stirred for 2 hours. Thereafter, the supernatant liquid was separated using a cannula (transport tube) equipped with a glass filter. The separated supernatant liquid was vacuumed to obtain dry sulfur. The sulfur-solubility (% by mass) was calculated from the mass of dry sulfur and the mass of the solvent in which the dry sulfur was dissolved.

When the second solvent is used, it is preferable to mix lithium sulfide, the halogen molecule, and the second solvent, and to further add and mix the first solvent, that is, before mixing using the first solvent, lithium sulfide and the halogen molecule are mixed in the second solvent, and then add the first solvent to mix lithium sulfide, the halogen molecule, the first solvent, and the second solvent. By mixing lithium sulfide and the halogen molecule in the second solvent before the mixing using the first solvent, the halogen molecule, particularly iodine, is dissolved in the second solvent to improve the reactivity, so that the reaction between the lithium sulfide and the halogen molecule is promoted to improve the reaction efficiency. In addition, since the dispersibility of lithium sulfide and the halogen molecule in the second solvent is improved in advance, when a complexing agent is used as the first solvent, a lithium halide complex is easily formed, and as described above, the remaining halogen molecule can be further reduced, so that the reaction efficiency is improved and a high reaction efficiency is obtained.

The mixing time of lithium sulfide and the halogen molecule in the second solvent is preferably 0.5 hours or longer, more preferably 1 hour or longer, and still more preferably at least 1.5 hours or longer, and the upper limit thereof is preferably 4 hours or shorter, more preferably 3 hours or shorter, and still more preferably 2.5 hours or shorter. When the mixing time in the second solvent is within the above range, deposition of lithium halide on the surface of lithium sulfide can be suppressed while improving the dispersion state of lithium sulfide and the halogen molecule.

When the second solvent is used, the amount of the second solvent to be used is preferably 2000 mL or more, more preferably 3500 mL or more, still more preferably 5000 mL or more, and even more preferably 6000 mL or more, and the upper limit thereof is preferably 10000 mL or less, more preferably 9000 mL or less, still more preferably 8000 mL or less, and even more preferably 7500 mL or less with respect to 1 kg of the total amount of lithium sulfide and the halogen molecule. When the amount of the second solvent to be used is within the above range, deposition of lithium halide on the surface of lithium sulfide can be suppressed while improving the dispersion state of lithium sulfide and the halogen molecule.

(Removing Solvent)

The production method of the present embodiment includes removing the solvent. Removing the solvent gives a lithium halide compound. Removing the solvent also includes removing the solvent present as a liquid from the mixture of lithium sulfide, the halogen molecule, the first solvent, and the second solvent used if necessary, and removing the first solvent from the lithium halide complex in which the first solvent is incorporated. It is possible to adjust which form of the removal of the solvent is performed by a method for removing the solvent. When the removal is performed in the former method, a method such as solid-liquid separation such as filtration and decantation may be adopted, and when the removal is performed in the latter method, a method by drying may be adopted. These methods will be described later.

As described above, the lithium halide compound may include a lithium halide, a lithium halide complex, a lithium halide composite containing plural kinds of halogen atoms, and the like. More specifically, when a complexing agent is used as the first solvent, the lithium halide compound contains a lithium halide complex together with lithium halide; when plural kinds of halogen molecules are used, the lithium halide compound contains a lithium halide composite containing plural kinds of halogen atoms together with lithium halide; and when a complexing agent is used as the first solvent and plural kinds of halogen molecules are used, the lithium halide compound contains a lithium halide complex and a lithium halide composite together with lithium halide.

Therefore, for example, when a complexing agent is used as the first solvent and plural kinds of halogen molecules are used, lithium halide, a lithium halide complex, and a lithium halide composite are obtained by removing the solvent by filtration, and lithium halide and a lithium halide composite are obtained by removing the solvent by drying.

Focusing on what is removed by removing the solvent, when only the first solvent is used, the first solvent is removed, and when the first solvent and the second solvent are used in combination, the first solvent and the second solvent are removed. In addition, as described above, when the second solvent is used, since the second solvent can dissolve the sulfur molecule which is a by-product, the sulfur molecule can also be removed by removing the solvent.

As will be described later, when the lithium halide compound and the sulfur molecule are washed using the third solvent, the third solvent also becomes a solvent to be removed by removing the solvent, and the sulfur molecule can also be removed in the same manner as the second solvent. In this case, the removing the solvent may be performed once after the mixing and again after washing, i.e., twice. This point will also be described in detail in the description of washing.

As a method for removing the solvent, filtration, drying and the like are preferably exemplified as described above, and these may be performed in combination.

Filtration is a method adopted for removing the solvent present as a liquid, and may be performed using, for example, a glass filter. As the glass filter, for example, a glass filter having a pore size of about 10 to 200 μm, preferably 20 to 150 μm may be used.

Drying is a method by which the first solvent (complexing agent) incorporated into the lithium halide complex can be removed together with the removal of the solvent present as a liquid.

Drying can be performed by drying under reduced pressure, drying by heating or the like, and for example, drying under reduced pressure and then drying by heating can be performed, or drying by heating under reduced pressure can be performed. When the solvent is removed by drying, the solvent is removed by volatilization or the like. Therefore, in the case where the lithium halide compound contains a lithium halide complex, the first solvent is volatilized and removed from the complex to form lithium halide. Therefore, when the first solvent is used and it is desired to convert the lithium halide complex into lithium halide, the solvent may be removed by drying.

Although the drying is a method capable of removing the first solvent incorporated in the lithium halide complex as described above, the lithium halide complex may be left as it is by adjusting the heating temperature to such an extent that the incorporated first solvent is not removed, or the lithium halide complex may be further dried by heating under such a temperature condition that the first solvent is removed to obtain lithium halide. In the drying by heating, the heating temperature can be adjusted as desired.

Drying under reduced pressure can be performed using, for example, a vacuum pump, and drying under vacuum is preferable from the viewpoint of shortening the drying time.

When the drying is performed by heating, the drying can be performed at a temperature corresponding to the types of the first solvent, and the second solvent and the third solvent used if necessary, and for example, can be performed at a temperature equal to or higher than the boiling points of these solvents. In this case, the heating temperature is usually from 5 to 100° C., preferably 10 to 85° C., more preferably 15 to 70° C., and still more preferably 20 to 60° C., although the heating temperature depends on the degree of pressure reduction and cannot be generally determined.

In addition, as the drying method, a method by solid-liquid separation is also preferably exemplified. The solid-liquid separation can be performed, for example, by decantation or by using a centrifugal separator or the like.

Concretely, the decanting can be carried out by transferring a mixture obtained by mixing lithium sulfide, a halogen molecule, a first solvent, and a second solvent to be used if necessary, and a mixture containing a third solvent to be used in the washing, which is adopted if necessary, to a container, and removing the first, second and third solvents which become supernatant after the solid is precipitated.

(Washing and Removing Sulfur Molecule)

The production method of the present embodiment may further include washing and removing a sulfur molecule. In the present embodiment, as shown in the above reaction formula (2), a sulfur molecule is produced as a by-product by the reaction between lithium sulfide and a halogen molecule, and it is possible to produce a lithium halide compound with high purity by removing the sulfur molecule.

In the case where the second solvent is used, since the sulfur molecule is usually dissolved in the second solvent, the sulfur molecule can be removed by removing the second solvent. Therefore, it can be said that the washing and removing the sulfur molecule are substantially performed by removing the solvent. When the second solvent is not used or even when the second solvent is used, it is preferable to perform washing and removing separately from the removal of the solvent from the viewpoint of further removing the sulfur molecule and obtaining a lithium halide compound with higher purity.

Washing may be performed after removing the solvent or before removing the solvent, but from the viewpoint of more efficiently removing the sulfur molecule, it is preferable to perform washing after removing the solvent, that is, to perform washing on the mixture containing the lithium halide compound and the sulfur molecule obtained by removing the first solvent and the second solvent from the mixture containing the lithium halide compound, the sulfur molecule, the first solvent, and the second solvent used if necessary.

As the washing method, washing using a third solvent is preferable because it is easy, and as the third solvent, a solvent capable of dissolving a sulfur molecule is preferable because it is easy to remove the sulfur molecule. Examples of the solvents capable of dissolving the sulfur molecule include those having a sulfur-solubility (20° C.) of preferably 0.1 g/L or more, more preferably 0.3 g/L or more, still more preferably 0.5 g/L or more, and particularly preferably 1 g/L or more, and the upper limit thereof is not particularly limited, but is 600 g/L or less, 550 g/L or less, and 100 g/L or less. That is, the third solvent can be appropriately selected and adopted from the solvents exemplified as the above-described second solvent, and examples thereof include hydrocarbon solvents such as aliphatic hydrocarbons, alicyclic hydrocarbons, and aromatic hydrocarbons; and solvents containing carbon atoms such as solvents containing carbon atoms and hetero atoms, and hydrocarbon solvents are preferable, aromatic hydrocarbons and aliphatic hydrocarbons are more preferable, aromatic hydrocarbons are still preferable, and toluene is particularly preferable, as is the case with the second solvent. Therefore, the second solvent and the third solvent are preferably the same (the same kind).

When the mixture of lithium halide and a sulfur molecule is washed using a third solvent, the washing may be performed by the same treatment as the above-described decantation in which a mixture of a lithium halide compound as a reactant and a sulfur molecule as a by-product obtained by removing the solvent from a mixture obtained by mixing lithium sulfide, a halogen molecule, a first solvent and a second solvent to be used if necessary by the above-described mixing is added to the third solvent, and after the lithium halide compound as a solid is precipitated, the solvent as a supernatant is discarded, or the above-described treatment may be repeated.

In a case where the washing is performed after performing the removing the solvent, and in a case where the washing is performed using a third solvent, it is preferable to further perform the removing the solvent after performing the washing. Thereby, the sulfur molecule can be removed together with the removal of the third solvent, so that the content of the sulfur molecule in the lithium halide compound can be further reduced. In this case, the removal of the solvent may be performed by appropriately selecting from the above-described methods for removing the solvent.

As described above, in the production method of the present embodiment, the removing the solvent may be performed twice. In this case, the first removal of the solvent is to remove the first solvent and the second solvent as well as the sulfur molecule contained in the second solvent from the mixture containing the lithium halide compound, the sulfur molecule, the first solvent and the second solvent used as necessary, which is obtained by the mixing described above, and the second removal of the solvent is to remove the third solvent as well as the sulfur molecule contained in the third solvent from the mixture containing the lithium halide compound, the sulfur molecule, and the third solvent after washing with the third solvent.

As described above, the lithium halide compound obtained by the production method of the present embodiment includes a lithium halide complex and a lithium halide composite in addition to the lithium halide. Since any of these lithium halide compounds has a low water content and high quality even though removal of water is not performed, it is suitably used as a raw material of a sulfide solid electrolyte.

The amount of water contained in the lithium halide compound obtained by the production method of the present embodiment is 1% by mass or less, and further 0.5% by mass or less, or 0.3% by mass or less. The lower limit is usually about 0.01% by mass. In the description herein, the amount of water in the lithium halide compound is a value measured under the conditions of 280° C. by a vaporization method using a Karl Fischer moisture meter, similarly to the amount of water in lithium sulfide.

The lithium halide compound obtained by the production method of the present embodiment has porosity as described above, and has a specific surface area measured by a BET method of 1.0 m²/g or more, and further 5.0 m²/g or more, or 10.0 m²/g or more. The upper limit is usually about 80.0 m²/g or less. In the description herein, the specific surface area is a value measured by a BET method (gas adsorption method), and nitrogen may be used as a gas (nitrogen method) or krypton may be used as a gas (krypton method), and the specific surface area is appropriately selected and measured according to the size of the specific surface area. The specific surface area can be measured using, for example, a commercially available apparatus such as a gas adsorption amount measuring apparatus (for example, AUTOSORB6 (manufactured by Sysmex Corporation)).

(Method for Producing Sulfide Solid Electrolyte)

The lithium halide compound obtained by the production method of the present embodiment is suitably used as a raw material for a sulfide solid electrolyte as described above. The sulfide solid electrolyte is obtained, for example, by a production method including reacting the lithium halide compound obtained by the production method of the present embodiment, a lithium compound other than lithium halide, and a phosphorus compound. The production method including reacting a lithium halide compound, a lithium compound other than lithium halide, and a phosphorus compound is a known method, and specific treatments, operations, and the like may be performed according to known methods.

Examples of the lithium halide compound include lithium fluoride, lithium chloride, lithium bromide, and lithium iodide depending on the halogen molecule used, and lithium bromide and lithium iodide are preferable. Preferred examples of the lithium compound other than the lithium halide compound include lithium sulfide (Li$_2$S), lithium oxide (Li$_2$O), and lithium carbonate (Li$_2$CO$_3$). Among them, lithium sulfide is preferable from the viewpoint of ion conductivity.

Preferred examples of the phosphorus compound include phosphorus sulfides such as diphosphorus trisulfide (P$_2$S$_3$) and diphosphorus pentasulfide (P$_2$S$_5$), and phosphate compounds such as sodium phosphate (Na$_3$PO$_4$) and lithium phosphate (Li$_3$PO$_4$). Among them, phosphorus sulfide is preferable, and diphosphorus pentasulfide (P$_2$S$_5$) is more preferable. Phosphorus compounds such as diphosphorus pentasulfide (P$_2$S$_5$) can be used without particular limitation as long as they are industrially produced and sold. These phosphorus compounds may be used alone or in combination of two or more thereof.

Further, as a compound containing a halogen atom other than a lithium halide compound, a halogen molecule, that is, fluorine (F$_2$), chlorine (Cl$_2$), bromine (Br$_2$), or iodine (I$_2$), preferably chlorine (Cl$_2$), bromine (Br$_2$), or iodine (I$_2$), and more preferably bromine (Br$_2$) or iodine (I$_2$) can also be used.

Among the above, a combination of lithium sulfide, diphosphorus pentasulfide and a lithium halide compound, and a combination of lithium sulfide, diphosphorus pentasulfide, a lithium halide compound and a halogen molecule are preferable.

When lithium sulfide, diphosphorus pentasulfide, and lithium halide are used as raw materials, the proportion of lithium sulfide to the total of lithium sulfide and diphosphorus pentasulfide is preferably 70 to 80 mol %, more preferably 72 to 78 mol %, and still more preferably 74 to 78 mol %, from the viewpoint of obtaining higher chemical stability and higher ion conductivity.

Further, when lithium bromide and lithium iodide are used in combination as the lithium halide, the proportion of lithium bromide to the total of lithium bromide and lithium iodide is preferably 1 to 99 mol %, more preferably 20 to 90 mol %, still more preferably 40 to 80 mol %, and particularly preferably 50 to 70 mol %, from the viewpoint of improving ion conductivity.

When lithium bromide and lithium iodide are used in combination as the lithium halide, the proportion of lithium bromide to the total of lithium bromide and lithium iodide is preferably 1 to 99 mol %, more preferably 20 to 90 mol %, still more preferably 40 to 80 mol %, and particularly preferably 50 to 70 mol %, from the viewpoint of improving ion conductivity.

When lithium sulfide, diphosphorus pentasulfide, a halogen simple substance, and a lithium halide are used, the content (a mol %) of the halogen simple substance and the content (8 mol %) of the lithium halide with respect to the total amount thereof preferably satisfy the following mathematical formula (2), more preferably satisfy the following mathematical formula (3), still more preferably satisfy the following mathematical formula (4), and even more preferably satisfy the following mathematical formula (5).

$$2 \leq 2\alpha + \beta \leq 100 \tag{2}$$

$$4 \leq 2\alpha + \beta \leq 80 \tag{3}$$

$$6 \leq 2\alpha + \beta \leq 50 \tag{4}$$

$$6 \leq 2\alpha + \beta \leq 30 \tag{5}$$

In the reaction of the lithium halide compound, the lithium compound other than the lithium halide, and the phosphorus compound, the reaction can be performed by a treatment such as mixing, stirring, or pulverization of these raw materials. For example, in the case of performing the treatment of mixing and stirring, a mechanical stirring type mixer used in the mixing in the production method of the present embodiment may be used, and in the case of performing the treatment of pulverization, a device generally called a pulverizer such as a media type mill such as a ball mill or a bead mill may be used.

In addition, when the reaction is carried out by mixing and stirring, it is preferable to stir (mix) the complexing agent exemplified as a preferred one of the first solvent with various solvents (for example, the solvent exemplified as the second solvent) and raw materials of a lithium halide compound, a lithium compound other than lithium halide, and a phosphorus compound as necessary, from the viewpoint that a solid electrolyte can be obtained without pulverization. In this case, by stirring (mixing), a slurry containing an electrolyte precursor composed of the raw material and the complexing agent, the liquid complexing agent, and the solvent is obtained. The slurry is dried to remove the liquid complexing agent and the solvent, and further heated to obtain the sulfide solid electrolyte.

The drying can be performed by any method capable of performing drying in the production method of the present embodiment, and the temperature conditions and the like when performing drying by heating are the same as the conditions of drying by heating in the production method of the present embodiment because the solvent used is the same as the solvent used in the production method of the present embodiment.

The sulfide solid electrolyte obtained by the above method contains a lithium element, a sulfur element, a phosphorus element, and a halogen element, and is basically an amorphous sulfide solid electrolyte. In the description herein, the amorphous sulfide solid electrolyte is a solid electrolyte having a halo pattern in which peaks other than peaks derived from a material are substantially not observed in an X-ray diffraction pattern in X-ray diffraction measurement, and the presence or absence of a peak derived from a raw material of the solid electrolyte does not matter.

Typical examples of the amorphous sulfide solid electrolytes obtained by using the lithium halide compound obtained by the production method of the present embodiment include solid electrolytes composed of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$-LI—LiBr; and solid electrolytes further containing other elements such as an oxygen element and a silicon element, such as $Li_2S$—$P_2S_5$—$Li_2O$—LiI and $Li_2S$—$SiS_2$—$P_2S_5$—LiI. From the viewpoint of obtaining higher ion conductivity, solid electrolytes composed of lithium sulfide, phosphorus sulfide, and lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, are preferable.

The types of elements constituting the amorphous solid electrolyte can be confirmed by, for example, an ICP emission spectrophotometer.

The amorphous sulfide solid electrolyte can be converted into a crystalline sulfide solid electrolyte by further heating. In the description herein, the crystalline solid electrolyte is a solid electrolyte in which a peak derived from the solid electrolyte is observed in an X-ray diffraction pattern in X-ray diffraction measurement, regardless of the presence or absence of a peak derived from a raw material of the solid electrolyte. That is, the crystalline solid electrolyte contains a crystal structure derived from the solid electrolyte, and a part thereof may be a crystal structure derived from the solid electrolyte, or the whole thereof may be a crystal structure derived from the solid electrolyte. As long as the crystalline solid electrolyte has the above-described X-ray diffraction pattern, part of the crystalline solid electrolyte may contain an amorphous solid electrolyte.

Therefore, the crystalline solid electrolyte includes so-called glass ceramics obtained by heating an amorphous solid electrolyte to a crystallization temperature or higher.

The heating temperature can be appropriately selected depending on the structure of the amorphous sulfide solid electrolytes and cannot be generally defined, but may be, for example, in the range of preferably 5° C. or higher, more preferably 10° C. or higher, and still more preferably 20° C. or higher, with the temperature of the peak top of the exothermic peak observed on the lowest temperature side as a starting point when a differential thermal analysis (DTA) is performed using a differential thermal analyzer (DTA device) under a temperature raising condition of 10° C./min, and the upper limit is not particularly limited, but may be about 40° C. or lower. To be specific, the heating temperature is usually preferably 130° C. or higher, more preferably 135° C. or higher, and still more preferably 140° C. or higher, and the upper limit thereof is not particularly limited, but is preferably 300° C. or lower, more preferably 280° C. or lower, and still more preferably 250° C. or lower.

The heating time is not particularly limited as long as a desired crystalline sulfide solid electrolyte is obtained, but is preferably 1 minute or more, more preferably 10 minutes or more, still more preferably 30 minutes or more, and even more preferably 1 hour or more. The upper limit of the heating time is not particularly limited, but is preferably 24 hours or less, more preferably 10 hours or less, still more preferably 5 hours or less, and even more preferably 3 hours or less.

Further, the heating is preferably performed in an inert gas atmosphere (for example, a nitrogen atmosphere or an argon atmosphere) or a reduced pressure atmosphere (in particular, a vacuum). This is because deterioration (for example, oxidation) of the crystalline solid electrolyte can be prevented. The heating method is not particularly limited, and examples thereof include a method using a hot plate, a vacuum heating apparatus, an argon gas atmosphere furnace, and a firing furnace. In addition, industrially, a horizontal dryer having a heating means and a feed mechanism, a horizontal vibration flow dryer, or the like can be used, and may be selected according to the amount of treatment to be heated.

Examples of the sulfide solid electrolytes obtained by using the lithium halide compound obtained by the production method of the present embodiment include sulfide solid electrolytes having a crystalline structure such as a $Li_3PS_4$ crystalline structure, a $Li_4P_2S_6$ crystalline structure, a $Li_7PS_6$ crystalline structure, a $Li_7P_3S_{11}$ crystalline structure, and a crystalline structure having peaks in the vicinity of $2\theta=20.2°$ and in the vicinity of $2\theta=23.6°$ (for example, JP 2013-16423 A).

In addition, sulfide solid electrolytes having a crystal structure such as a $Li_{4-x}Ge_{1-x}P_xS_4$ thio-LISICON Region II type crystal structure (see Kanno et al., Journal of The Electrochemical Society, 148 (7) A742-746 (2001)), a crystal structure similar to a $Li_{4-x}Ge_{1-x}P_xS_4$ thio-LISICON Region II type crystal structure (see Solid State Ionics, 177 (2006), 2721-2725), and the like can also be mentioned. From the viewpoint of ion conductivity, it is preferable that the crystal structure is a thio-LISICON Region II type crystal structure. Here, the "thio-LISICON Region II type crystal structure" indicates any one of a $Li_{4-x}Ge_{1-x}P_xS_4$ thio-LISICON Region II type crystal structure and a crystal structure similar to a $Li_{4-x}Ge_{1-x}P_xS_4$ thio-LISICON Region II type crystal structure.

Since the sulfide solid electrolyte thus obtained is obtained by using a lithium halide compound containing no water as a raw material, the sulfide solid electrolyte has low water content, high ion conductivity, and excellent battery performance. Therefore, the sulfide solid electrolyte obtained using the lithium halide compound obtained by the production method of the present embodiment can be used for any application requiring Li ion conductivity, and is particularly suitably used for a battery. The sulfide solid electrolyte may be used in the positive electrode layer, may be used in the negative electrode layer, or may be used in the electrolyte layer, and each layer can be produced by a known method.

In addition to the positive electrode layer, the electrolyte layer and the negative electrode layer, it is preferable to use a current collector as the above battery, and a known current collector can be used. For example, a layer in which a substance that reacts with the sulfide solid electrolyte, such as Au, Pt, Al, Ti, or Cu, is coated with Au or the like can be used.

EXAMPLES

Next, the present invention will be specifically described by Examples, but the present invention is not limited by these Examples at all.

Production Example: Production of Lithium Sulfide (Li₂S)

As a water-insoluble medium, toluene (manufactured by SUMITOMO CORPORATION) was dehydrated and measured by a Karl Fischer moisture meter to obtain a water content of 100 ppm. Then, 303.8 kg of the dehydrated toluene was added to a 500-L stainless steel reactor under a nitrogen gas stream, followed by 33.8 kg of anhydrous lithium hydroxide (manufactured by The Honjo Chemical Corporation), and the mixture was maintained at 95° C. while stirring with a twin-star stirring blade at 131 rpm.

The temperature was raised to 104° C. while blowing hydrogen sulfide (manufactured by Sumitomo Seika Chemicals Co., Ltd.) into the slurry at a feed rate of 100 L/min. An azeotropic gas of water and toluene was continuously discharged from the reactor. This azeotropic gas was dehydrated by condensing it with a condenser outside the system. During this time, the same amount of toluene as the distilled toluene was continuously supplied to keep the level of the reaction solution constant.

The water content in the condensate gradually decreased, and distillation of water was no longer observed 24 hours after the introduction of hydrogen sulfide. During the reaction, solids were dispersed in toluene and stirred, and there was no water separated from toluene.

After this, hydrogen sulfide was switched to nitrogen and flowed at 100 L/min for 1 hour.

Example 1

0.50 g (10.9 mmol) of lithium sulfide (Li₂S) was introduced into a Schlenk (volume: 100 mL) equipped with a stirring element under a nitrogen atmosphere. 20 mL of toluene was added as a second solvent, the stirring element was rotated, 2.76 g (10.9 mmol) of iodine was added as a halogen molecule, lithium sulfide and iodine were mixed in the second solvent for 2 hours, 4 mL of dehydrated ethyl acetate was added as a first solvent, and the mixture was further mixed for 2 hours. After it was visually confirmed that there was no iodine-induced coloration in the supernatant, toluene and ethyl acetate used as solvents were removed under vacuum, and further dried by heating at 100° C. for 2 hours. After drying, 50 mL of toluene was added and stirred for 10 minutes. After stirring, the mixture was allowed to stand to precipitate the solid matter, and 40 mL of the supernatant was removed. This decantation was repeated three times. After decanting, drying by heating under vacuum at 100° C. was carried out for 2 hours to obtain a powder.

The obtained powder was subjected to powder X-ray diffraction (XRD) measurement by the following method. The lithium sulfide used as a raw material was also subjected to XRD measurement by the same method as above. The results of these XRD measurements are shown in FIG. 1. As shown in FIG. 1, it was confirmed that the obtained powder was a powder of lithium iodide because the peak of lithium sulfide disappeared and the powder had a peak attributed to lithium iodide.

In the description herein, powder X-ray diffraction (XRD) measurement was performed as follows.

Each of the powders obtained in Examples and Comparative Examples was filled in a groove having a diameter of 20 mm and a depth of 0.2 mm and leveled with glass to obtain a sample. The sample was sealed with a Kapton film for XRD and measured under the following conditions without being exposed to air.

Measuring apparatus: D2 PHASER, manufactured by Bruker
Tube voltage: 30 kV
Tube current: 10 mA
X-ray wavelength: CuKα ray (1.5418 Å)
Optical system: Concentration method
Slit configuration: Solar slit 4°, divergence slit 1 mm, Kβ filter (Ni plate) used
Detector: Semiconductor detector
Measurement range: 2θ=10 to 60 deg
Step width, scan speed: 0.05 deg, 0.05 deg/sec Example 2

0.50 g (10.9 mmol) of lithium sulfide (Li₂S) was introduced into a Schlenk (volume: 100 mL) equipped with a stirring element under a nitrogen atmosphere. 20 mL of toluene was added as a second solvent, the stirring element was rotated, 2.76 g (10.9 mmol) of iodine was added as a halogen molecule, lithium sulfide and iodine were mixed in the second solvent for 2 hours, 4 mL of tetramethylethylenediamine (TMEDA) was added as a first solvent, and the mixture was further mixed for 2 hours. After the mixing, toluene and tetramethylethylenediamine used as solvents were removed under vacuum, followed by drying by heating at 100° C. for 2 hours to obtain a powder.

The obtained powder was subjected to powder X-ray diffraction (XRD) measurement by the same method as in Example 1. The results of the XRD measurement of the powder are shown in FIG. 2. In the powder, although the peak of lithium sulfide has disappeared, a peak different from the peak of lithium iodide in Example 1 has been generated, and it is considered that the powder is neither lithium sulfide nor lithium iodide, that is, it is a lithium iodide complex composed of lithium iodide and tetramethylethylenediamine.

Further, the powder was dried by heating at 200° C. for 2 hours. The powder obtained by the drying was subjected to powder X-ray diffraction (XRD) measurement by the same method as in Example 1. The results of the XRD measurement of the powder are shown in FIG. 2. The powder had the same peak as that of the powder obtained in Example 1, i.e., lithium iodide, and was confirmed to be lithium iodide.

Example 3

0.50 g (10.9 mmol) of lithium sulfide (Li₂S) was introduced into a Schlenk (volume: 100 mL) equipped with a stirring element under a nitrogen atmosphere. 20 mL of toluene was added as a second solvent, the stirring element was rotated, 0.87 g (5.44 mmol) of bromine and 1.38 g (5.44 mmol) of iodine were added as halogen molecules, lithium sulfide, bromine and iodine were mixed in the second solvent for 2 hours, 4 mL of dehydrated ethyl acetate was added as a first solvent, and the mixture was further mixed for 2 hours. After the mixing, toluene and ethyl acetate used as solvents were removed under vacuum, followed by drying by heating at 100° C. for 2 hours to obtain a powder.

The obtained powder was subjected to powder X-ray diffraction (XRD) measurement by the same method as in Example 1. As shown in FIG. 3, it was confirmed that the obtained powder had peaks attributable to lithium bromide and lithium iodide while the peak of lithium sulfide disappeared, and was a powder of lithium bromide and lithium iodide.

Example 4

0.50 g (10.9 mmol) of lithium sulfide ($Li_2S$) was introduced into a Schlenk (volume: 100 mL) equipped with a stirring element under a nitrogen atmosphere. 20 mL of toluene was added as a second solvent, the stirring element was rotated, 2.76 g (10.9 mmol) of iodine was added as a halogen molecule, lithium sulfide and iodine were mixed in the second solvent for 2 hours, 4 mL of dehydrated tetrahydrofuran (THF) was added as a first solvent, and the mixture was further mixed for 2 hours. After mixing, toluene and tetrahydrofuran used as solvents were removed under vacuum at room temperature (23° C.), and a powder was obtained.

The obtained powder was subjected to powder X-ray diffraction (XRD) measurement by the same method as in Example 1. The results of the XRD measurement of the powder are shown in FIG. 4. In the powder, although the peak of lithium sulfide has disappeared, a peak different from the peak of lithium iodide in Example 1 has been generated, and it is considered that the powder is neither lithium sulfide nor lithium iodide, that is, it is a lithium iodide complex composed of lithium iodide and tetrahydrofuran.

Further, the powder was dried by heating at 100° C. for 2 hours. The powder obtained by the drying was subjected to powder X-ray diffraction (XRD) measurement by the same method as in Example 1. The results of the XRD measurement of the powder are shown in FIG. 4. The powder had the same peak as that of the powder obtained in Example 1, i.e., lithium iodide, and was confirmed to be lithium iodide.

Example 5

0.50 g (10.9 mmol) of lithium sulfide ($Li_2S$) was introduced into a Schlenk (volume: 100 mL) equipped with a stirring element under a nitrogen atmosphere. 20 mL of cyclohexane was added as a second solvent, the stirring element was rotated, 2.76 g (10.9 mmol) of iodine was added as a halogen molecule, lithium sulfide and iodine were mixed in the second solvent for 2 hours, 4 mL of dehydrated tetrahydrofuran (THF) was added as a first solvent, and the mixture was further mixed for 2 hours. After mixing, toluene and tetrahydrofuran used as solvents were removed under vacuum at room temperature (23° C.), and a powder was obtained.

Further, the powder was dried by heating at 100° C. for 2 hours. The powder obtained by the drying was subjected to powder X-ray diffraction (XRD) measurement by the same method as in Example 1. The results of the XRD measurement of the powder are shown in FIG. 5. The powder had the same peak as that of the powder obtained in Example 1, i.e., lithium iodide, and was confirmed to be lithium iodide.

Comparative Example 1

0.50 g (10.9 mmol) of lithium sulfide ($Li_2S$) was introduced into a Schlenk (volume: 100 mL) equipped with a stirring element under a nitrogen atmosphere. After 20 mL of toluene was added as a second solvent and the stirring element was rotated, 2.76 g (10.9 mmol) of iodine was added as a halogen molecule and mixing of lithium sulfide and iodine was carried out in the second solvent for 50 hours. After mixing, the mixture was left to stand to precipitate the powder. Then, the supernatant liquid was extracted and treated with a sodium thiosulfate aqueous solution. Then, a composition analysis by ICP analysis (inductively coupled plasma emission spectrometry) was performed. As a result, it was confirmed that 28% of iodine remained unreacted in 2.76 g of iodine used as a raw material.

The sample obtained in Comparative Example 1 was photographed using a scanning electron microscope (SEM), and elemental analysis was performed by an energy dispersive X-ray spectrometer (EDS apparatus). FIG. 6 shows an SEM image taken by a scanning electron microscope (SEM). According to FIG. 6, it can be seen that lithium iodide (a thinner region indicated by LiI in the figure) is generated around lithium sulfide (a thicker region indicated by $Li_2S$ in the figure). Thus, it was confirmed that unreacted lithium sulfide remained in the method of Comparative Example 1.

EDS images of the results of elemental analysis of the sulfur element and the iodine element in the sample by an energy dispersive X-ray spectrometer (EDS apparatus) are shown in FIGS. 7 and 8, respectively. It was also confirmed from the results of the EDS images that the sulfur element was present in a region portion where lithium sulfide was present, the iodine element was present in a region portion where lithium iodide was present, and the sulfur element remained due to unreacted lithium sulfide.

INDUSTRIAL APPLICABILITY

According to the production method of the present invention, it is possible to industrially advantageously produce a lithium halide compound having a low water content, particularly lithium bromide and lithium iodide, at a high reaction efficiency without accompanying a step of directly removing water. Since the obtained lithium halide compound has a low water content, it can be suitably used as a raw material for a sulfide solid electrolyte.

The invention claimed is:

1. A method for producing a lithium halide complex, comprising:
   mixing lithium sulfide, a halogen molecule of at least one of bromine and iodine, and a second solvent;
   subsequently adding and mixing the first solvent to obtain a lithium halide complex; and
   subsequently removing the first solvent and the second solvent;
   wherein:
   the first solvent has a solubility of lithium bromide and lithium iodide of 1 g/L or more;
   the first solvent is an aprotic solvent having at least one functional group selected from an ester group and an amino group;

the second solvent has a solubility of lithium bromide and lithium iodide of less than 1 g/L;

the first solvent is added in an amount of 100 to 3,000 mL per 1 kg of a total amount of lithium sulfide and the halogen molecule; and the second solvent is added in an amount of 3,500 mL to 10,000 mL per 1 kg of the total amount of lithium sulfide and the halogen molecule.

2. The method for producing a lithium halide complex according to claim 1, further comprising washing and removing a sulfur molecule.

3. The method for producing a lithium halide complex according to claim 2, wherein a third solvent is used in the washing and removing.

4. The method for producing a lithium halide complex according to claim 3, wherein removal of the third solvent is performed by at least one treatment selected from filtration and heating under reduced pressure.

5. The method for producing a lithium halide complex according to claim 3, wherein the third solvent has a solubility of sulfur molecule of 0.1 g/L or more.

6. The method for producing a lithium halide complex according to claim 3, wherein the third solvent is at least one selected from the group consisting of an aromatic hydrocarbon and an aliphatic hydrocarbon.

7. The method for producing a lithium halide complex according to claim 3, wherein the second solvent and the third solvent are the same.

8. The method for producing a lithium halide complex according to claim 1, wherein the second solvent is at least one selected from the group consisting of an aromatic hydrocarbon and an aliphatic hydrocarbon.

9. The method for producing a lithium halide complex according to claim 1, wherein the second solvent has a boiling point of 150° C. or lower.

10. The method for producing a lithium halide complex according to claim 1, wherein mixing is performed without pulverization.

11. The method for producing a lithium halide complex according to claim 1, wherein the first solvent has a solubility of lithium bromide and lithium iodide of 3 g/L or more and 1000 g/L or less.

12. The method for producing a lithium halide complex according to claim 1, wherein the second solvent has a solubility of lithium bromide and lithium iodide of 0.01 mg/L or more and 0.5 g/L or less.

13. The method for producing a lithium halide complex according to claim 1, wherein the first solvent is added in an amount of 300 to 1,550 mL per 1 kg of a total amount of lithium sulfide and the halogen molecule.

14. The method for producing a lithium halide complex according to claim 1, wherein the second solvent is added in an amount of 5,000 mL to 8,000 mL per 1 kg of the total amount of lithium sulfide and the halogen molecule.

* * * * *